R. RIVERA.
HYDRAULIC MOTOR.
APPLICATION FILED NOV. 1, 1915.

1,219,156.

Patented Mar. 13, 1917.
2 SHEETS—SHEET 1.

WITNESSES:
Y. C. Barry
L. A. Stanley

INVENTOR
Ruben Rivera
BY Munn & Co.
ATTORNEYS

R. RIVERA.
HYDRAULIC MOTOR.
APPLICATION FILED NOV. 1, 1915.
1,219,156.
Patented Mar. 13, 1917.
2 SHEETS—SHEET 2.
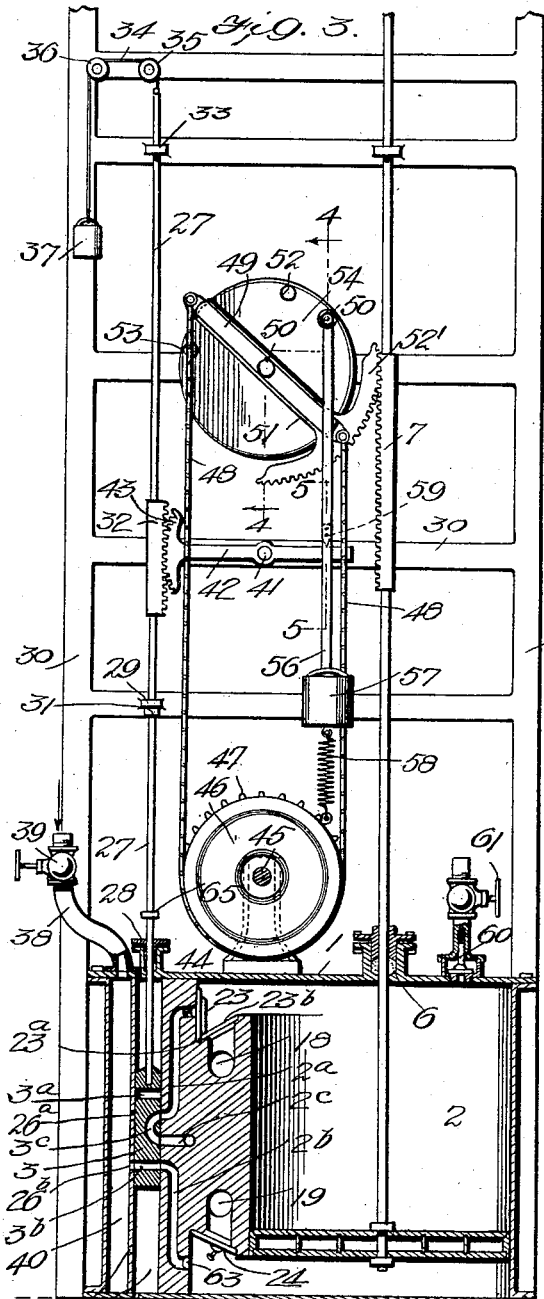
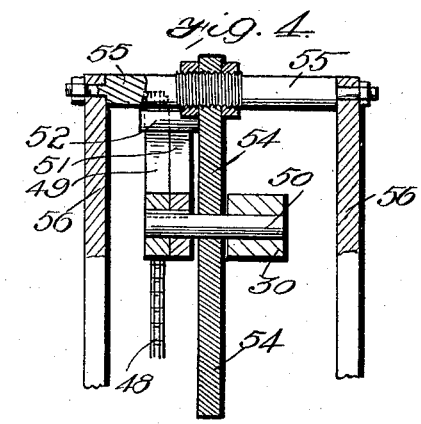
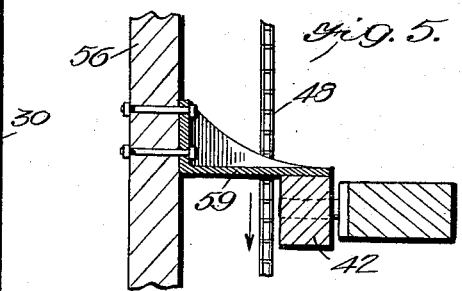
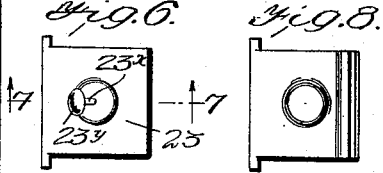
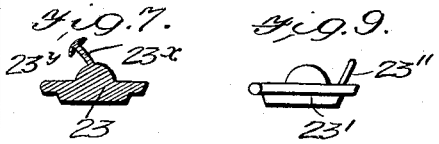
INVENTOR
Ruben Rivera
BY Munn & Co.
ATTORNEYS

UNITED STATES PATENT OFFICE.

RUBÉN RIVERA, OF SONSONATE, SALVADOR.

HYDRAULIC MOTOR.

1,219,156.

Specification of Letters Patent.

Patented Mar. 13, 1917.

Application filed November 1, 1915. Serial No. 58,973.

*To all whom it may concern:*

Be it known that I, RUBÉN RIVERA, a citizen of the Republic of El Salvador, and a resident of Sonsonate, in the Republic of El Salvador, Central America, have invented a certain new and useful Improvement in Hydraulic Motors, of which the following is a specification.

My invention relates to improvements in hydraulic motors, and it consists in the combination, construction and arrangements herein described and claimed.

An object of my invention is to provide a hydraulic motor which is simple in construction, but which is highly efficient, owing to its novel arrangement of parts.

A further object of my invention is to provide a hydraulic motor in which the shifting of the valves to turn the motive fluid first in one direction and then in the other is accomplished automatically and instantaneously.

A further object of my invention is to provide a novel arrangement by means of which this instantaneous shifting of the valves may be accomplished.

A further object of my invention is to provide a hydraulic motor having a quick acting valve so arranged that it is relieved from water pressure, thereby necessitating comparatively little force to operate the valve.

Other objects and advantages will appear in the following specification, and the novel features of the invention will be particularly pointed out in the appended claims.

My invention is illustrated in the accompanying drawing forming part of this application, in which:

Fig. 3 is an enlarged view of a portion of the apparatus shown in Fig. 1, the parts of the device being in different positions.

Fig. 4 is a section on the line 4—4 of Fig. 3.

Fig. 5 is a section on the line 5—5 of Fig. 3.

Fig. 6 is a plan view of one of the valves.

Fig. 7 is a sectional view on the line 7—7 of Fig. 6.

Fig. 8 is a plan view of a modified form of valve, and,

Fig. 9 is a side view of the valve shown in Fig. 8.

Figure 1:
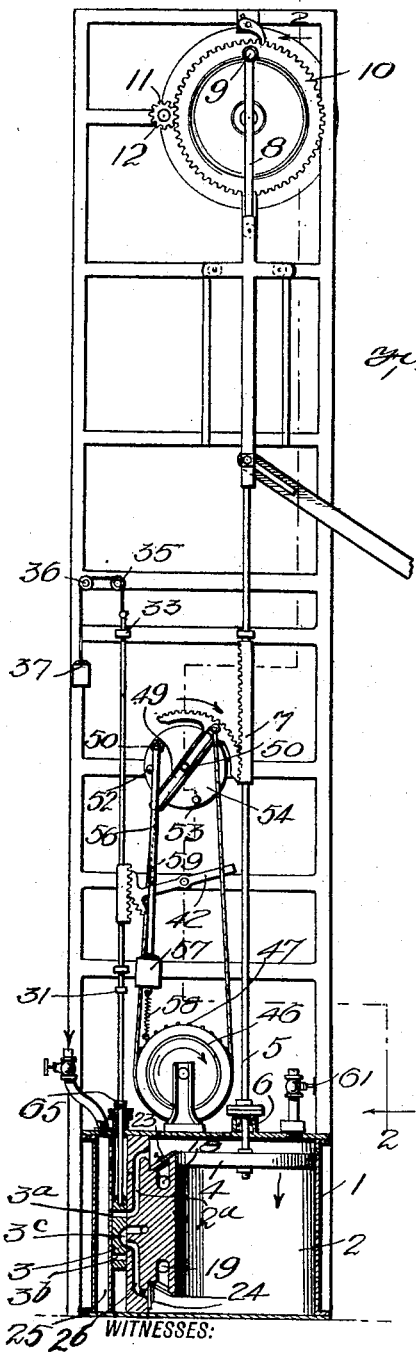
Figure 1 is a side view of the device, certain parts being shown in section.

In carrying out my invention I provide an exterior casing 1, which incloses a cylinder 2, and a slide valve 3. Within the cylinder is a piston 4, whose piston rod 5 extends through a stuffing-box 6 in the top of the casing 1. At 7 I have shown a rack which is connected to the piston rod 5. The piston rod is extended beyond the rack and terminates in a pitman 8, which is pivotally connected at 9 to a gear 10, which meshes with a pinion 11 on a shaft 12. The latter may bear a fast pulley 13 and an idler or loose pulley 14. This shaft 12 is also provided with a fly wheel 15.

Referring now again to Fig. 1 it will be seen that the slide valve 3 is provided with the ports $3^a$ and $3^b$, respectively. This valve also has a passage $3^c$, see Figs. 1 and 2. The ports $3^a$ and $3^b$ are designed to register with passages $2^a$ and $2^b$, respectively, in the cylinder casting, this registration depending upon the position which the valve has assumed. The passage $3^c$ is arranged to connect the central passage $2^c$ with either of the passages $2^a$ or $2^b$, according to the position of the valve. The passage $2^c$ communicates with a discharge pipe 17 (see Fig. 2).

Figure 2:
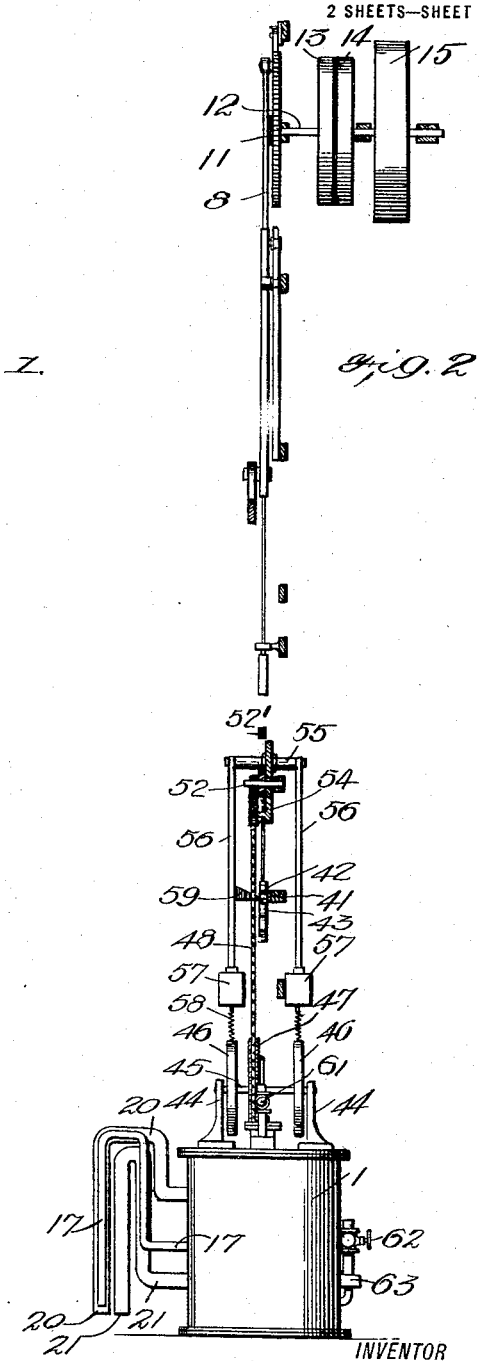
Fig. 2 is a section on the line 2—2 of Fig. 1.

The discharge passages 18 and 19 are provided, the former being connected with the discharge pipe 20 and the latter with the discharge pipe 21 (see Fig. 2). A valve 23 like that shown in Fig. 7 is pivoted at $23^a$ and is adapted to engage a valve seat $23^b$, thereby closing the passage 18. A similar valve 24 is adapted to close the passage 19. The valve 23 when in the position shown in Fig. 3 closes the passage $2^a$ and the valve 24 is similarly adapted to close the passage $2^b$. These valves both are automatic in their operation and to this end an extension $23^x$ is provided with an umbrella-like member $23^y$, arranged to extend into the passage $2^a$. The automatic action of the valves 23 and 24 will be explained later.

The slide valve 3, it will be observed, is disposed in a chamber 25 formed between the outer portion of the cylinder casting and a partition 26. The partition 26 has two openings $26^a$ and $26^b$, which are adapted to register with the passages 3ª and 3ᵇ in the different positions of the valve. The valve 3 is provided with a valve stem 27, which passes through a stuffing-box 28, thence upwardly through a guide member 29 on the frame 30. The guide member 29 also acts as a stop member, as will be explained later, the valve stem 27 being provided with a stop member 31. At 32 I have shown a rack portion. The upper end of the valve stem 27 passes through a guide 33. A flexible cable 34 is attached to the valve stem and passes over the pulleys 35 and 36, a counterweight 37 being attached to the cable, as shown.

At 38 I have shown an intake pipe which is controlled by a valve 39. This pipe leads into a chamber 40, which communicates by means of the ports 26ª and 26ᵇ with the passages 3ª and 3ᵇ in the valve 3, as before stated.

Disposed on a portion of the frame 30 is a stub shaft 41 upon which is mounted a lever 42 having a segment 43, whose teeth are in engagement with those of the rack 32.

Mounted on the casing 1 are supports 44 for a shaft 45, which bears wheels 46, see Figs. 2 and 3, and which also bears a sprocket wheel 47. A sprocket chain 48 runs over the sprocket wheel 47. One end of this sprocket chain 48 is connected at the end of an arm 49, which is mounted on a shaft 50. The other end of the chain 48 is secured to the opposite end of the arm 49. The arm 49 is secured to a lever 51, which bears a segment 52' in engagement with the rack 7. As far as results are concerned the arm 49 might be integral with the lever 51, the object of the arm 49 being to bring the chain 48 out of the path of pins 52 and 53, on a wheel 54, which is loosely mounted on the shaft 50. The shaft 50, it may be stated has one end pivotally mounted in the frame 30.

The wheel 54, Fig. 4, is provided with laterally extending arms 55, to the ends of which are pivotally connected rods 56. These rods extend downwardly and to their ends are secured weights 57. To the bottom of each of the weights is attached a spiral spring 58, and the ends of the spiral springs are secured to the wheels 46. One of the rods 56 is provided with an arm or lug 59 which projects over the lever 42, see Fig. 5, so as to operate the latter in the manner hereinafter described.

From the foregoing description of the various parts of the device the operation thereof may be readily understood.

Consider the mechanism in the position shown in Fig. 1 with the piston 4 at the top of its stroke, and with the valve 3 in position to afford a passage from the chamber 40 to the space above the piston. In Fig. 3 I have shown a spring-pressed valve 60 with a cock 61. This cock is open while a cock 62 of a similar valve 63 which is disposed at the inner end of the passage 2ᵇ (see Fig. 3) is also open. The water now comes in through the inlet pipe 38, the valve 39 having been opened and passes from the compartment 40 by means of the ports 26ª and 3ª into the space above the piston 4, driving out the air past the valve 60. As soon as the air is driven out the cock 61 is closed and the water now forces the piston downwardly in the direction shown by the arrow in Fig. 1, the air beneath the piston passing out past the valve 63, the cock 62 being open. As soon as the piston has forced all the air out then the cock 62 is closed, in which case the water has entirely filled the interior of the motor.

At the first downward movement of the piston the rack 7, which is in engagement with the segment 52', turns the lever 51 and the arm 49 clockwise, thereby turning the wheel 46 clockwise. At this movement the weights 57 begin to move from the position shown in Fig. 1 to that shown in Fig. 3. As the arm 49 is revolved it comes in contact with the pin 52, on the wheel 54 (see Fig. 1) thereby turning the wheel 54, which as stated before, is loosely mounted on the shaft 50 in a clockwise direction. The moment, however, that the arms 55 (see Figs. 4 and 1) pass the point which is directly above the center of the wheel 54, the weights 57, which have been raised during the revolution of the wheel 54, will suddenly move downwardly, due to their own weight and also due to the stretching of the spring 58. This will cause arm 59 on one of the rods 56 to strike the lever 42, thereby suddenly shifting the lever from the position shown in Fig. 1 to that shown in Fig. 3. This causes a quick shifting of the valve 3, owing to the engagement of the segment 43 with the rack 32. The movement is assisted by the weight 37.

The shifting of the valve 3 causes the water now to enter the passage 2ᵇ into the space below the piston, pushing the valve 24 so as to close the passage 19, and forcing the piston upwardly. The movement of the piston upwardly will cause a rush of water above the piston toward the passage 2ª, but this initial rush of water will engage the umbrella-like extension of the valve 23 and open it so as to permit the passage of the water into the outlet 18, while closing off the passage 2ª.

The upward movement of the piston will continue until the arm 49, which has engaged the pin 53 (see Fig. 3) has moved the wheel 54 far enough so as to bring the arms 55, which support the rods 56, again above the center of the wheel 54, whereupon the weights 57 which are being gradually shifted to the other side of a vertical line drawn through the center of the wheels 54 and 46 will move downwardly, and this movement will cause the engagement of the arm 59 with the lever 42 on the opposite side of the fulcrum 41, so as to cause the segment 43 to move downwardly carrying with it the rack 32 and thus shifting the valve 3. The movement of the valve 3 is limited by the engagement of the stop members 29 and 31 in one direction and by a collar 65 in the reverse direction, this collar 64 engaging the stuffing-box 28.

It will be observed that when the valve is shifted to its upper position, as shown in Fig. 3, and the water is coming through the passage 2$^b$, the initial out-rush of water from above the piston will be through the passage 2$^a$. This initial out-rush is carried away by the registering passage 3$^c$, which communicates with the discharge passage 2$^c$. When, however, the valve 23 closes the passage 2$^a$, then the water is discharged through the passage 18. As will be observed from Fig. 2, the passages 2$^c$, 18 and 19 communicate with the pipes 17, 20 and 21, respectively. The latter are arranged in the form of siphons to aid in causing the ready flow of the water.

A successful hydraulic motor of this type is dependent upon a quick throw of the valve, and it will be observed that this is secured by the apparatus described. The main slide valve 3 requires comparatively little power to move it, since it is not subjected to full pressure of the water, as are many valves of hydraulic motors.

The motor which forms the subject of the present application has great power, owing to the fact that the area of the piston is much greater than that of the intake pipe 38.

In Fig. 9 I have shown a modified form of the valve in which the body portion 23′ is provided with a wing 23″. This wing is designed to be engaged by the first out-rush of water into the passage 2$^a$, and serves substantially the same purpose as the umbrella-like member 23$^y$ shown in Fig. 7.

I am aware that various forms of the device based upon the same general principle might be made, but I regard as my own, all such modifications as fairly fall within the spirit and the scope of the appended claims.

What I claim is:—

1. In a hydraulic motor, a cylinder, a piston thereon, a main slide valve, connections between the piston rod and said main slide valve for operating the latter, a discharge passage at each end of the cylinder, and automatic valves operated by the motive fluid for controlling the said passages.

2. In a hydraulic motor, a cylinder, a piston therein, a main slide valve for directing the motive fluid alternately to opposite sides of the piston, a lever having operative connection with said main slide valve, a suspension member, an arm secured to the suspension member, a weight carried by the suspension member, means operated by the movement of the piston for raising the suspension member and for dropping the latter and the attached weight at a predetermined moment, so as to bring the arm in contact with the lever, thereby moving the latter and shifting the valve.

3. In a hydraulic motor, a cylinder, a piston therein, a main slide valve for directing the motive fluid alternately to opposite sides of the piston, a lever having operative connection with said main slide valve, a suspension member, an arm secured to the suspension member, a weight carried by the suspension member, means operated by the movement of the piston for raising the suspension member and for dropping the latter and the attached weight at a predetermined moment, so as to bring the arm in contact with the lever, thereby moving the latter and shifting the valve, and means for subsequently raising the suspension member and dropping it on the opposite side of the fulcrum of the lever, thereby shifting the lever in the opposite direction, through the engagement with the arm of the suspension member.

4. In a hydraulic motor, a cylinder, a piston therein, a main slide valve for directing motive fluid alternately to opposite sides of the piston, a lever operatively connected with said valve, a wheel loosely mounted for revolution on a fixed axis, a suspension member carried by said wheel, an arm secured to said suspension member, a weight carried by said suspension member, and means connected with the piston for rotating said wheel, so as to shift the point of suspension from one side of the wheel to the other, and for permitting the weight to move downwardly by gravity, thereby causing engagement of the arm with the lever and thus shifting the valve.

5. In a hydraulic motor, a cylinder, a piston therein, a main slide valve for directing motive fluid alternately to opposite sides of the piston, a lever operatively connected with said valve, a wheel loosely mounted for revolution on a fixed axis, a suspension member carried by said wheel, an arm secured to said suspension member, a weight carried by said suspension member, means connected with the piston for rotating said wheel, so as to shift the point of suspension from one side of the wheel to the other, and for permitting the weight to move downwardly by gravity, thereby causing engagement of the arm with the lever and thus shifting the valve and for reversing the movement of the wheel to bring the arm into engagement with the lever on the opposite side of the fulcrum, and thereby shifting the valve in the opposite direction.

6. In a hydraulic motor, a cylinder, a piston therein, a main slide valve for directing the motive fluid alternately to opposite sides of the piston, a rotatable wheel, a suspension member carried by said wheel, a weight carried by said suspension member, a spring secured to the bottom of the weight, a second rotatable wheel having connection with said spring means connected with said piston for rotating said first mentioned wheel, thereby raising and lowering the weight, means for rotating said second named wheel, thereby shifting the position of the weight, an arm carried by said suspension member, and a lever having operative connection with said valve, said arm being arranged to engage said lever alternately on opposite sides of the fulcrum.

RUBÉN RIVERA.

Copies of this patent may be obtained for five cents each, by addressing the "Commissioner of Patents, Washington, D. C."